United States Patent [19]

Huhman

[11] Patent Number: 4,706,690
[45] Date of Patent: Nov. 17, 1987

[54] CROP DIRECTOR FOR A ROTARY COMBINE

[75] Inventor: Michael L. Huhman, Kansas City, Mo.

[73] Assignee: Deutz-Allis Corporation, Milwaukee, Wis.

[21] Appl. No.: 937,689

[22] Filed: Dec. 4, 1986

[51] Int. Cl.⁴ .................. A01F 12/00; A01F 29/10
[52] U.S. Cl. ................................ 130/27 P; 130/27 Q
[58] Field of Search ............. 130/27 P, 27 Q, 27 T; 56/14.6

[56]  References Cited

U.S. PATENT DOCUMENTS

| | | | |
|---|---|---|---|
| 3,943,939 | 3/1976 | Rowland-Hill | 130/27 T |
| 4,117,849 | 10/1978 | Pakosh | 130/27 Q |
| 4,159,023 | 6/1979 | Todd et al. | 130/27 T |
| 4,282,703 | 8/1981 | Wilson et al. | 130/27 T |
| 4,306,572 | 12/1981 | Campbell et al. | 130/27 T |
| 4,342,319 | 8/1982 | Willis et al. | 130/27 P |
| 4,458,697 | 7/1984 | James | 56/14.6 |
| 4,501,282 | 2/1985 | Muller et al. | 56/14.6 |
| 4,665,929 | 5/1987 | Helm | 130/27 T |

*Primary Examiner*—Paul J. Hirsch
*Attorney, Agent, or Firm*—Charles L. Schwab

[57] ABSTRACT

An axial flow combine having a foraminous cylindrical cage with a radial inlet through which crop material is fed by a feeder conveyor. The crop material is engaged by a threshing rotor having rasp bars with diagonal flanges tending to move the crop material axially in a direction away from the inlet. Helical ribs on the inside of the cage also urge the crop material in the same axial direction. A crop directing plate at the side of the inlet toward which the incoming crop material is urged forces the crop material to move circumferentially about the interior of the cage and across a substantial portion of the concave which is the same width as the inlet.

3 Claims, 2 Drawing Figures

CROP DIRECTOR FOR A ROTARY COMBINE

TECHNICAL FIELD

This invention relates to feeding crop material into a rotary combine and more particularly to the provision of means for directing or guiding incoming crop material across the concave of the threshing cage.

PRIOR ART STATEMENT

In an earlier designed rotary combine of the same general type as involved in this invention, the concave in the cylindrical threshing cage was of greater axial width than the inlet or feed opening so as to ensure that the incoming crop material passed across the concave as it moved in its spiral path through the axial flow threshing cage. Although the spiral ribs on the inside of the axial flow threshing cage do not extend across the concave, the diagonal flanges on the rasp bars of the threshing rotor urge the incoming crop material axially in the same direction as the spiral ribs. The provision of a concave which is wider than the feeder inlet in the cage requires an offset construction in the cage with attendant increase in manufacturing cost. Also in such a concave having a built-in rock door, the sealing of the rock door relative to the concave and the sealing of the concave relative to the cage in the area of the rock door was a problem which required a complex sealing structure.

OBJECTS AND SUMMARY OF THE INVENTION

It is a primary object of this invention to provide a concave in a rotary combine which is the same width as the feed inlet of the cage and to provide means to ensure movement of incoming crop material across the concave as it passes into the cage.

More specifically, it is an object of this invention to provide guide means at the inlet to counteract the axial movement imparted to the incoming crop material by the diagonal flanges on the rasp bars of the threshing rotor.

This invention is particularly useful in a combine having a crop processor which includes a foraminous cylindrical cage with a radial inlet, a concave circumferentially aligned with the inlet, a discharge opening spaced axially from the inlet and a crop feeder connected in crop delivery relation to the inlet. The combine of this invention includes a rotor coaxially mounted within the cage with circumferentially spaced members presenting radially outward projecting crop engaging flanges extending diagonally in relation to the axis of the rotor whereby crop material delivered to the processor by the feeder is moved axially in the cage by the flanges toward the discharge opening. Further, the combine of this invention has a crop director secured thereto at a circumferentially extending edge at the side of the inlet toward which the incoming crop is moved by the flanges on the rotor. The crop director includes an arcuate portion extending radially inward into the cage a predetermined distance in radially spaced confronting relation to the flanges of the rotor. The crop director assists in guiding incoming crop material entering the inlet across the concave in opposition to the axial movement effect of the flanges on the incoming crop material.

BRIEF DESCRIPTION OF THE DRAWINGS

One embodiment of the invention is illustrated in the drawings in which.

DETAILED DESCRIPTION OF THE DRAWINGS

Figure 1:
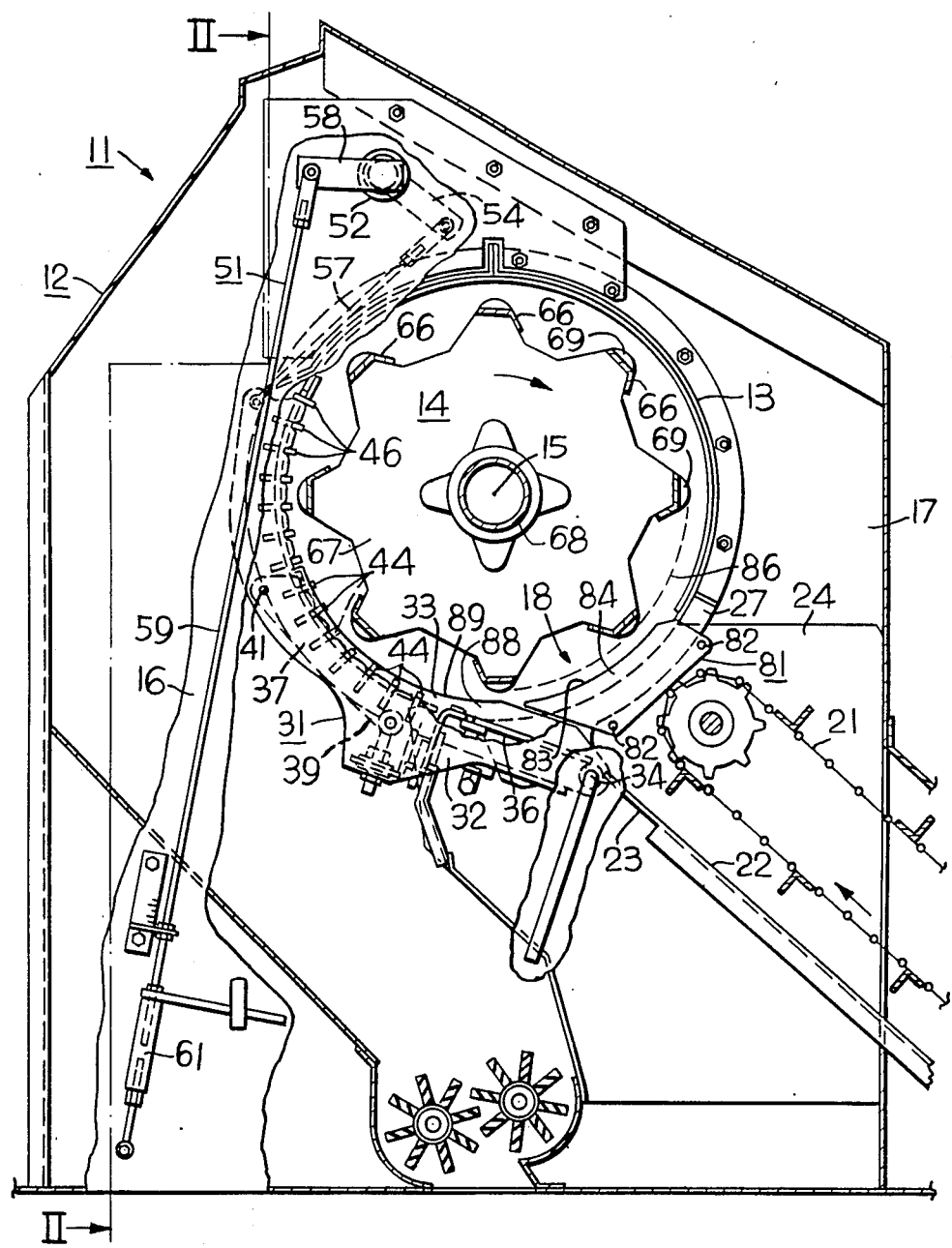
FIG. 1 is a partial side view of a combine with parts broken away for illustration purposes.
Figure 2:
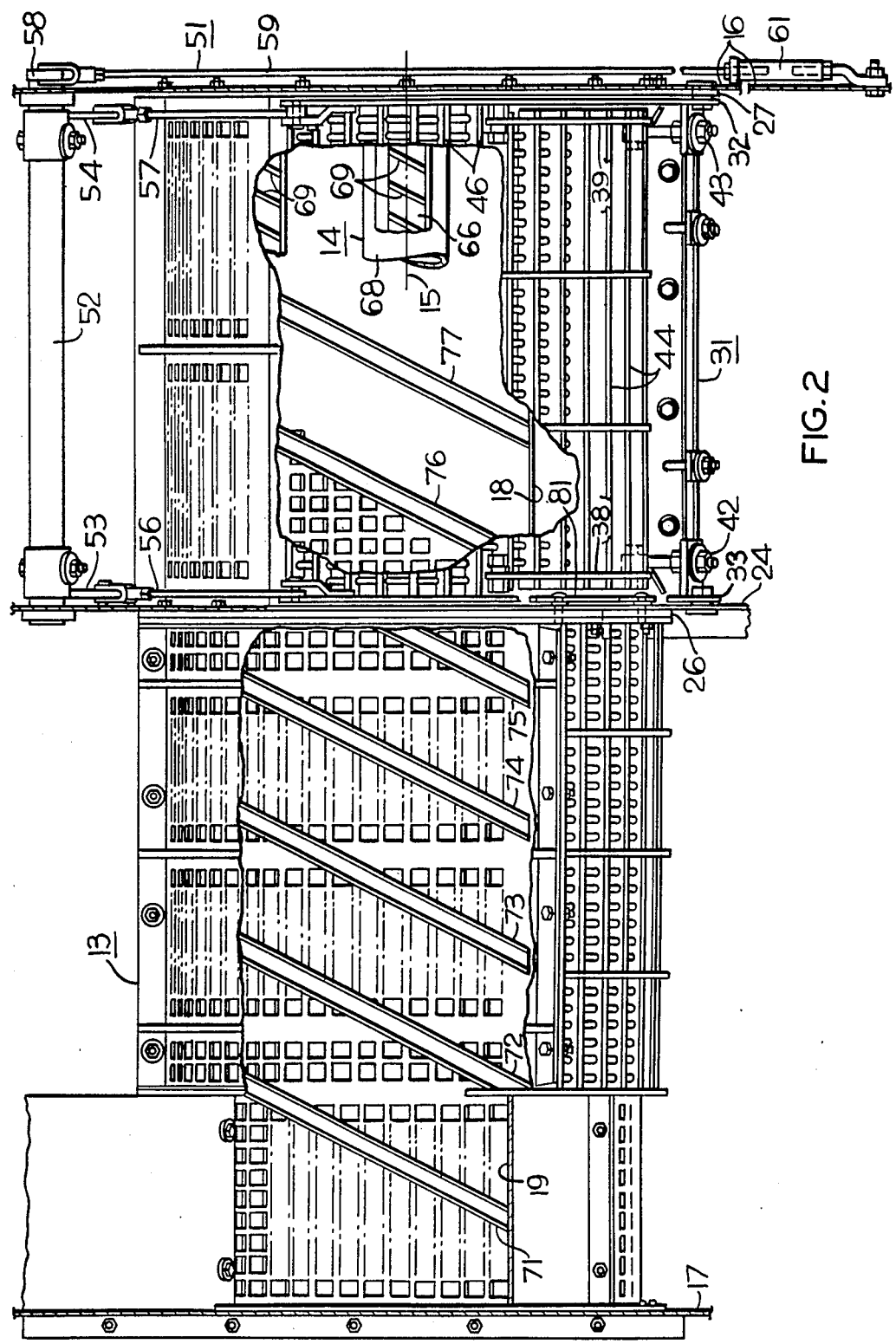
FIG. 2 is a view taken along the line II—II in FIG. 1 with parts broken away for illustration purposes.

Referring to FIGS. 1 and 2, the combine in which this invention is used includes a processor section 11 having a housing 12 in which a foraminous cylindrical cage 13 and a rotor 14 are coaxially mounted on a transverse axis 15. The cage 13 is secured at its opposite ends to laterally opposite side walls 16, 17 of the processor housing 12 and is made up of arcuate segments secured to one another by bolts and nuts. A radially open inlet 18 is provided at the axial end of the cage 13 adjacent the side wall 16 and a radial discharge opening 19 is provided at the opposite axial end of the cage 13 adjacent the side wall 17. A crop feeder in the form of a conveyor 21 delivers the cut crop being harvested to the inlet 18 of the cage 13. The conveyor 21 is disposed in a feeder housing 22 having a floor 23 and laterally spaced vertical side walls which are comprised of the side wall 16 and an inner side wall 24. Thus the feeder housing is the same width as the feed inlet 18 which extends between radial cage flanges 26, 27.

A combined concave and rock door structure 31 of the same width as the inlet 18 has arms 32, 33 at its opposite lateral sides which are pivotally mounted on the combine for pivotal adjustment about an axis 34 which is parallel to the axis 15 about which the rotor 14 rotates. A rock door 36 is pivotally mounted on the concave arms 32, 33 on the axis 34 and a pressure responsive latch, not shown, allows the door 36 to swing downwardly when a stone or other hard foreign object of predetermined size becomes wedged between the rotor 14 and the door 36. The concave part of the structure 31 includes an adjustable concave grate or section 37 which has arms 38, 39 pivotally mounted on the arms 32, 33 for adjustment about a transverse axis 41 by adjustment mechanisms 42, 43. Axially extending parallel bars 44 are secured to the arms 38, 39. The upper grate or section of the concave includes similar bars 46 secured to the side arms 32, 33. The concave structure 31 is adjusted about its pivot axis 34 by an adjustment linkage 51 which includes a pivot shaft 52 with lever arms 53, 54 pivotally connected to the upper ends of links 56, 57 which in turn have their lower ends pivotally connected to the upper ends of the concave arms 32, 33. The adjustment linkage also includes a lever arm 58 pivotally connected to a rod 59 which is secured at its lower end to the side wall 17 by a bolt and a nut and includes a turnbuckle 61 for adjusting its length. Rotation of the turnbuckle 61 changes the length of the rod 59 which in turn effects a change in the clearance between the bars 44, 46 of the concave grates and the rotor 14.

The rotor 14 includes a plurality of axially extending and circumferentially spaced members in the form of rasp bars 66 secured to discs 67 mounted at axially spaced points on the rotor shaft 68. The rasp bars 66 each include a plurality of radially outward projecting crop engaging flanges 69 which extend diagonally in relation to the axis 15 of the rotor.

The cage 13 is provided with a plurality of axially spaced helical ribs 71-77 extending radially inward to engage the crop material and help move it axially from the inlet 18 to the outlet 19 during rotation of the rotor 14. There are no helical ribs on the concave structure 31 to urge the incoming crop material axially away from the inlet 18; however, the diagonal flanges 69 on the rasp bars 66 do urge the incoming crop material axially away from the inlet. In order to counteract such axial movement of the incoming crop material, a crop director in the form of a plate 81 is rigidly secured to the feeder side wall 24 by appropriate fasteners 82. The crop director 81 is at the circumferentially extending edge defining the laterally inner side of the inlet and includes a portion 84 extending radially inward into the cage and presenting an arcuate surface 83 a predetermined distance from the path of the radially outer edges of the flanges 69 of the rasp bars 66, such path being represented by broken line 86. The crop director 81 is aligned with the inner arm 33 of the concave. Further, to help guide incoming crop material across the rock door 36 and onto the concave bars 44, 46 where threshing action will occur, the concave arm 33 includes a part 88 which extends radially inward along a substantial circumferential distance from its end adjacent the crop director 81. The arcuate radially inward facing edge 89 of the part 88 is substantially a smooth continuation of the arcuate surface 83 of the crop director 81. Thus the part 88 of the arm 33 operates as a continuation of the crop director 81.

During operation, the incoming crop material fed through the inlet 18 by the feeder conveyor 21 is engaged by the diagonal flanges 69 of the rasp bars 66 of the rotor 14 which urge the crop material to move axially from the inlet 18. It is preferred that the crop material moves circumferentially a substantial distance from the opening 18 and across the bars 44, 46 of the concave before moving axially beyond the inlet 18 and the concave. The radially inward extending crop director 81 and the radially inward extending part 88 of the concave side arm 33 aligned with the crop director 81 counteracts to a substantial extent the axial urging imparted to the crop material by the diagonal flanges 69, whereby the crop material moves across the rock door 36 and onto the concave before being shifted axially away from the concave. In a previous combine design, the concave extended axially inward of the inlet so that the crop material was sure to pass over a portion of the concave. This was a costly design because of the offset required in the cage and the complicated sealing structure that was required. The crop direction of this invention permits a more compact cage construction in which the concave is the same width as the feed inlet and a relatively simple sealing arrangement may be used for the concave structure in the area of the rock door.

The embodiments of the invention in which an exclusive property or privilege is claimed are defined as follows:

1. A combine having a crop processor including a foraminous cylindrical cage,
   a radially open inlet in said cage,
   a radial discharge opening in said cage spaced axially from said inlet,
   a concave circumferentially aligned with said inlet and of the same axial width,
   a crop feeder connected in crop delivery relation to said inlet,
   a rotor rotatably mounted within said cage in generally coaxial relation to the latter having circumferentially spaced members presenting radially outward projecting crop engaging flanges extending diagonally in relation to the axis of said rotor whereby crop material delivered to said processor by said feeder is moved axially in said cage by said flanges toward said discharge opening,
   said inlet having a circumferentially extending edge at the side thereof toward which the crop material entering the cage by way of said inlet is moved axially ty said flanges, and
   a crop director secured to said combine at said circumferentially extending edge and including a portion extending radially inward into said cage from said edge and presenting an arcuate edge a predetermined radial distance from said flanges of said rotor, said crop director assisting in guiding incoming crop material entering said inlet across said concave in opposition to the axial movement effect of said flanges on said incoming crop material.

2. The combine of claim 1 wherein said concave includes a grate with axially extending bars and a support frame including an arcuate arm circumferentially aligned with said arcuate portion of said crop director and having a part extending radially inward to assist in guiding said incoming crop material onto said grate.

3. The combine of claim 2 wherein the radially inward facing edge of said part of said arcuate arm is substantially a smooth continuation of said arcuate edge of said crop director.

* * * * *